(12) United States Patent
Kazmierczak (10) Patent No.: US 6,204,580 B1
(45) Date of Patent: Mar. 20, 2001

(54) DIRECT GAS COOLED ROTOR ENDWINDING VENTILATION SCHEMES FOR ROTATING MACHINES WITH CONCENTRIC COIL ROTORS

(75) Inventor: Edmund E. Kazmierczak, Schenectady, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/500,616

(22) Filed: Feb. 9, 2000

(51) Int. Cl.[7] .................................................. H02K 9/00
(52) U.S. Cl. ............................. 310/52; 310/61; 310/261
(58) Field of Search ............................. 310/52, 61, 260, 310/261, 270; 29/598

(56) References Cited

U.S. PATENT DOCUMENTS

| 2,786,951 | 3/1957 | Morgan | 310/61 |
|---|---|---|---|
| 3,225,231 | 12/1965 | Kudlacik | 310/64 |
| 4,031,422 * | 6/1977 | Armor et al. | 310/256 |
| 4,071,790 | 1/1978 | Darby et al. | 310/59 |
| 4,141,669 | 2/1979 | Darby et al. | 408/1 R |
| 4,301,386 | 11/1981 | Schweder et al. | 310/59 |
| 4,335,324 | 6/1982 | Fujioka et al. | 310/61 |
| 4,352,034 | 9/1982 | Karhan et al. | 310/59 |
| 4,546,279 | 10/1985 | Hammer et al. | 310/59 |
| 4,922,147 | 5/1990 | Sismour, Jr. et al. | 310/61 |
| 4,967,465 | 11/1990 | Frank | 29/598 |
| 5,252,880 | 10/1993 | Kazmierczak et al. | 310/270 |
| 5,281,877 | 1/1994 | Kazmierczak et al. | 310/59 |
| 5,593,274 | 1/1997 | Carreono et al. | 415/115 |
| 5,644,179 * | 7/1997 | Staub et al. | 310/65 |
| 5,929,550 | 7/1999 | Kaminski et al. | 310/219 |

FOREIGN PATENT DOCUMENTS

0166990 * 1/1986 (EP) .

* cited by examiner

Primary Examiner—Joseph Waks
(74) Attorney, Agent, or Firm—Nixon & Vanderhye (57) ABSTRACT

A cooling gas ventilation circuit for an endwinding of a rotary machine having a rotor and a plurality of coils seated in radial slots provided in the rotor, the coils each comprising a plurality of radially stacked turns, the turns having radial passages therein, the coils extending beyond a pole face of the rotor to form an endwinding; a substantially cylindrical baffle ring covering radially innermost turns of the plurality of coils in the endwinding, the baffle ring having a plurality of holes therein aligned with the radial passages; and wherein the radial passages communicate with cavities between the coils in the endwinding.

25 Claims, 11 Drawing Sheets

ID_GAS COOLED ROTOR
ENDWINDING VENTILATION SCHEMES
FOR ROTATING MACHINES WITH
CONCENTRIC COIL ROTORS

BACKGROUND OF THE INVENTION

This invention relates generally to the rotor windings of a dynamo-electric machine, and particularly, to endwinding ventilation schemes for machines with concentric rotor windings.

The rotors in large gas cooled dynamo-electric machines have a rotor body which is typically made from a machined high strength solid iron forging. Axially extending radial slots are machined into the outer periphery of the rotor body at specific circumferential locations to accommodate the rotor winding. The rotor winding in this type of machine typically consists of a number of complete coils, each having many field turns of copper conductors. The coils are seated in the radial slots in a concentric pattern with, for example, two such concentric patterns in a two-pole rotor. The coils are supported in the rotor body slots against centrifugal forces by metallic wedges which bear against machined dovetail surfaces in each slot. The regions of the rotor winding coils which extend beyond the ends (or pole faces) of the main rotor body are called "endwindings" and are supported against centrifugal forces by high strength steel retaining rings. The inboard end of each retaining ring is typically shrunk onto a machined surface at the end of the rotor body. The outboard end of each retaining ring is typically shrunk onto a circular shaped steel member called a centering ring. A section of the rotor shaft forging which is located underneath the rotor endwindings is referred to as the spindle.

Thus, the rotor winding can be separated into two major regions, the rotor body region within the radial slots in the rotor, and the rotor endwinding region that extends beyond the pole face, radially spaced from the rotor spindle. This invention relates primarily to ventilation schemes for the rotor endwinding region.

In order to reduce costs and machine size, rotating machine manufacturers are continuously seeking methods of obtaining more power output from a given volume of machine. Rotor winding thermal limitations are a major obstacle toward achieving this goal. Accordingly, more effective rotor winding cooling schemes facilitate the manufacturer's ability to achieve the desired higher power output.

Several rotor endwinding cooling approaches have been used in the past. Most of these approaches utilize longitudinally grooved copper windings where cooling gas enters the field turns from an open cavity via inlet ports at the sides of the turns, and then flows longitudinally along the grooves to discharge locations which are typically either chimneys in the rotor body or discrete baffled discharge zones under and around the endwinding. The gas in these baffled zones is typically discharged either to the air gap (i.e., the gap between the rotor and stator) via machine slots in the pole face, or to the area outside of the centering ring via openings in the centering ring. Some schemes utilize discharges through radial holes in the retaining rings.

BRIEF SUMMARY OF THE INVENTION

This invention provides a new direct gas cooled rotor endwinding ventilation scheme for machines with concentric rotor windings. A typical application is for round rotor turbine driven generators.

The present invention utilizes a non-metallic baffle ring on each end of the machine, completely covering the radially inner surfaces of the respective rotor endwindings and segregating the rotor body ventilation regions of the windings from the rotor endwinding ventilation regions of the windings. Since the endwindings at opposite ends of the rotor are identical, only one will be described herein.

Carefully located radial holes are formed in the baffle ring that allow the entrance of cooling gas through the baffle ring to the rotor endwinding. Cooling gas flows radially through the holes in the baffle ring to corresponding in-line radial vent holes or ducts forming radial passages in the copper field turns of the rotor endwinding coils. A selected number (or all) of these turns have lateral exit ports machined therein. In one embodiment of the invention, the lateral exit ports extend from the radial passage to the outer edge of the turn on one or both sides of the turn. The rotor's pumping head drives the flow of gas through the cooling paths. Cooling gas thus flows through the radial passages and lateral ports and exits into longitudinal cavities formed between the coils on one or both sides of the coil of interest.

In another embodiment, some or all of the field turns have longitudinal grooves that originate at the radial passages in the turns. These grooves run along the turns (for uniform or different lengths) and terminate at lateral exit ports machined in the turns from the longitudinal grooves to the outer edge of the turns on one or both sides of the turns. Cooling gas can thus flow through the radial passages in the field turns, then longitudinally along the grooves to the lateral exit ports where it discharges into the longitudinal cavities formed between the coils (on one or both sides of the coils).

In both embodiments, vent holes or slots are machined in the steel teeth at the end of the rotor body. Thus, cooling gas discharged from the coil can now flow via the longitudinal cavities through the tooth vent slots and discharge into the machine's air gap. In addition, one or more of the coils may have turns with longitudinal grooves extending into the rotor body to permit an alternative gas discharge circuit where the cooling gas exits via radial chimneys in the windings themselves, along and within the rotor body.

Any inter-coil spacer blocks in the longitudinal cavities (used to maintain adjacent coils in predetermined spaced relationship) that are obstructing cooling flow can be provided with vent passages that allow the cooling gas to flow through the spacer blocks. Another alternative is to bypass the spacer blocks via internal grooves machined along the field turns to suitable exit ports on the far side of the spacer block. Other bypass schemes may be devised as well. One such example is to design by-pass passages into the baffle ring design.

In still another variation, to further increase the cooling gas discharge area in the endwinding, the baffle ring may be modified to provide an additional axial gas flow passage to distribute gas to slots machined in the rotor pole faces or to radial holes in the centering ring via the longitudinal cavity in the center of the coils. In other words, additional holes in the baffle ring are aligned with the space at the center of a group of concentrically arranged coils, and one or more discharge slots are provided in the pole face, opening into the longitudinal cavity and discharging into the air gap. Axially extending baffle plates are used to channel cooling gas axially into the area of the modified baffle ring holes so that gas flowing radially inwardly from the longitudinal cavities through the discharge holes in the sleeve-like baffle ring, flows axially between the baffle plates and discharges into the pole face discharge slots or into the discharge holes in the centering ring, or both.

With the radial/lateral rotor endwinding ventilation schemes in accordance with this invention, many new ventilation arrangements are possible, such as using multiple side-by-side ducts, multiple staggered ducts, and diagonal flow passages, which then also opens up the possibility for counterflow schemes that reduce and provide more uniform rotor endwinding temperatures. The cooling schemes disclosed herein also make full use of the space on each side of the coil of interest as ventilating gas flowpaths, and for convection cooling of the outer surfaces of the field turns of the coils.

With the rotor endwinding ventilation schemes in accordance with the invention, several advantages may be realized:

a) Improved ventilation via direct gas cooling in which hot spot and average winding temperatures are reduced;

b) More uniform temperatures throughout the endwinding;

c) Ability to provide many short length cooling passages in direct contact with the copper field turns, thereby limiting cooling gas temperature rise;

d) Ability to devise many ventilation patterns including counterflow ventilation schemes;

e) Relatively simple manufacturing complexity compared to other schemes; and f) Reduced machine volume for a given output rating.

In its broadest aspects, therefore, the present invention relates to a cooling gas ventilation circuit for an endwinding of a rotary machine having a rotor, and a plurality of coils seated in radial slots provided in the rotor, the coils each comprising a plurality of radially stacked turns, the turns having radial passages therein, the coils extending beyond a pole face of the rotor to form an endwinding; a substantially cylindrical baffle ring covering radially innermost turns of the plurality of coils in the endwinding, the baffle ring having a plurality of holes therein aligned with the radial passages; and wherein the radial passages communicate with cavities between the coils in the endwinding.

DETAILED DESCRIPTION OF THE INVENTION

Figure 1:
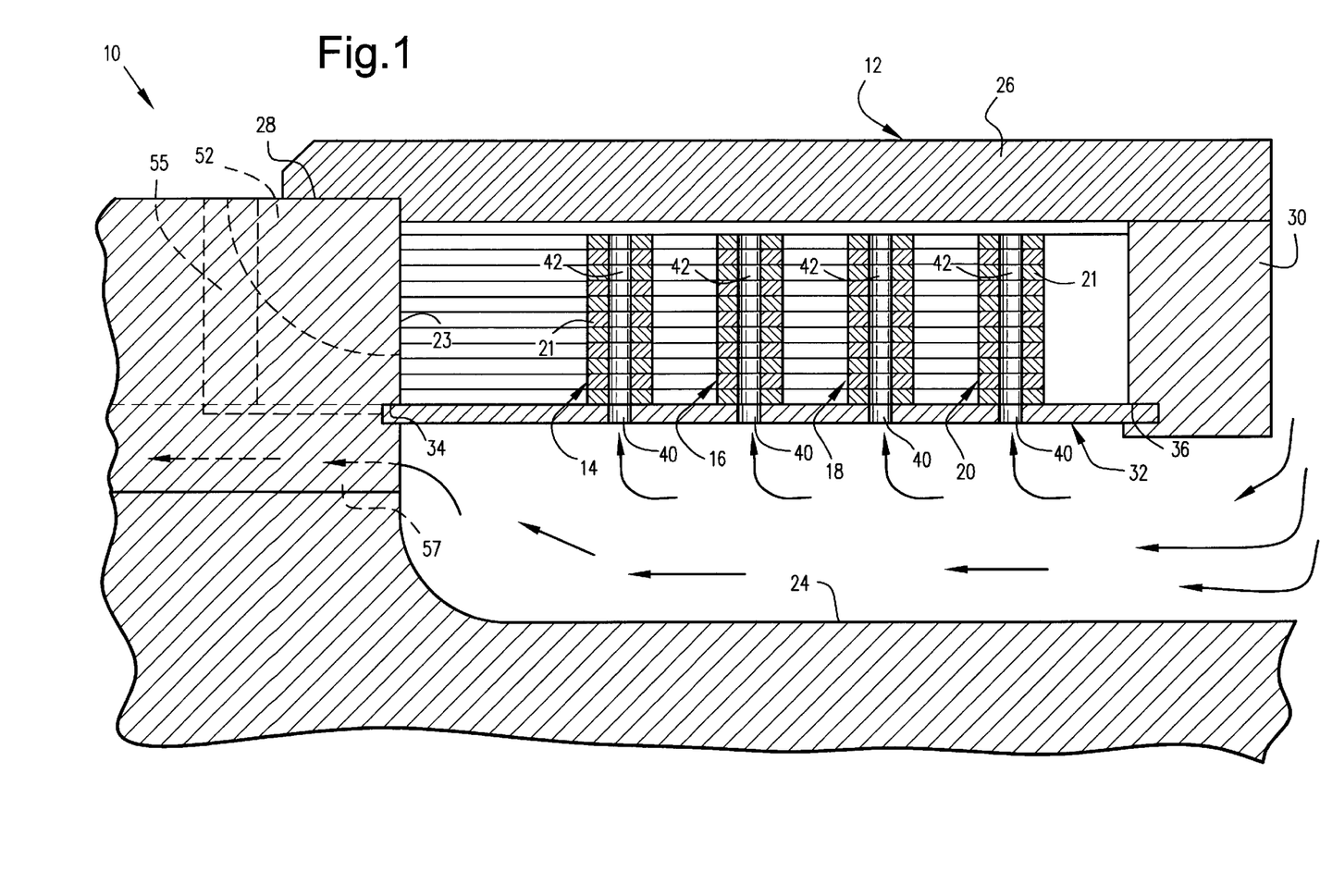
FIG. 1 is a partial radial section of one end of a machine rotor.
Figure 2:
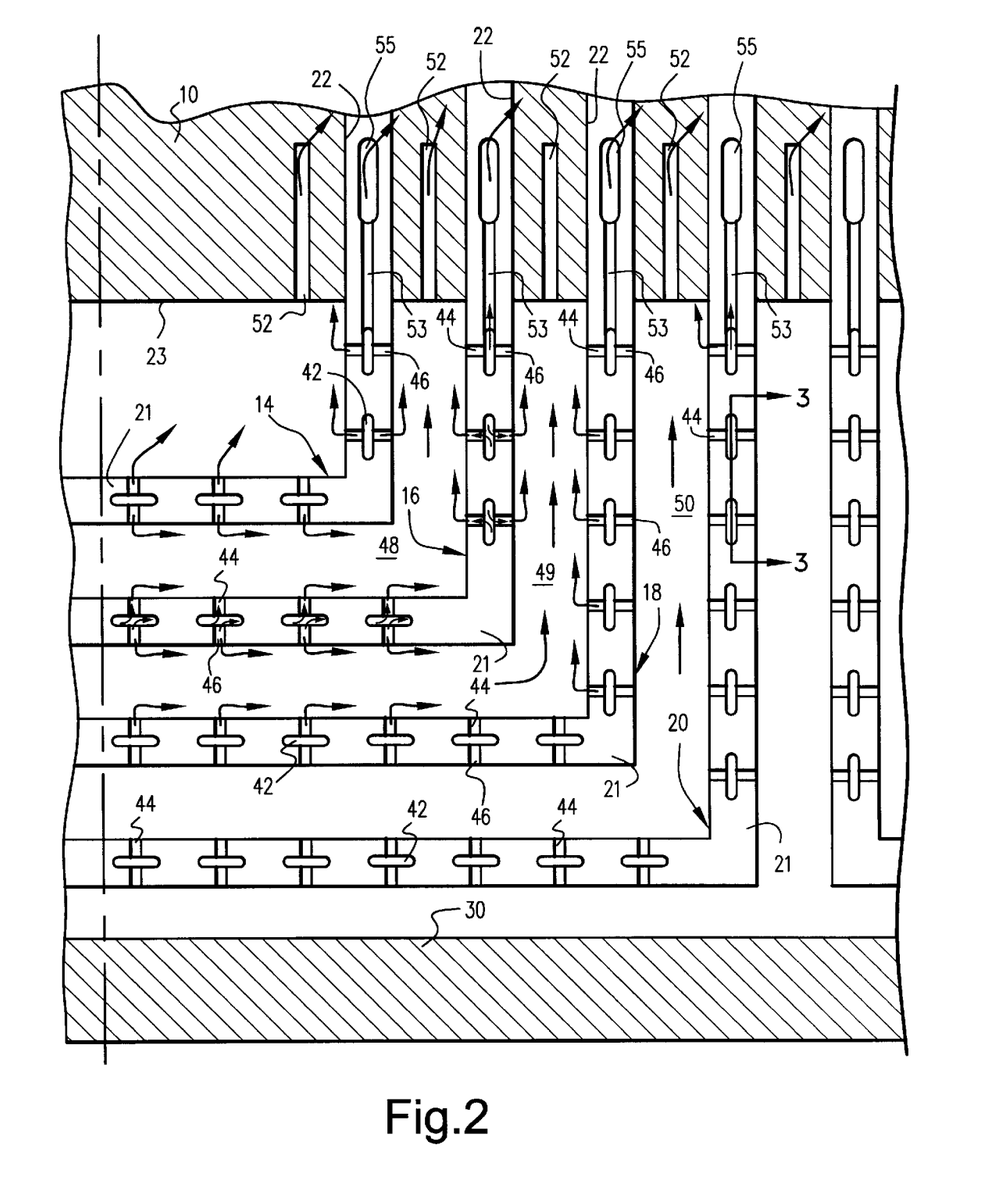
FIG. 2 is a partial top plan view, partially sectioned, of the coils of a rotor endwinding at one end of the rotor.

With reference to FIG. 1, one end of a rotor body 10 is illustrated with a rotor endwinding 12 extending beyond one end of the rotor body. The rotor endwinding includes the end region of a number of complete coils 14, 16, 18 and 20 in a concentric, generally rectangular configuration. For a two pole rotor, two such concentric sets of coils are arranged on opposite sides of the rotor. The invention is applicable, however, to other rotor configurations as well. Each coil includes many field turns 21 of copper conductors in a stacked configuration. This invention can be applied to windings where the individual turns are made up of multiple layers of conductors as well as just single conductors. These coils are nested within the radial slots 22 machined into the outer periphery of the rotor body, with the endwindings extending axially beyond the rotor body at both ends of the machine in conventional fashion. A spindle portion 24 of the rotor extends in an axial direction, radially inward of the endwinding. The coils 14, 16, 18 and 20 are supported in the slots 22 of the rotor body against centrifugal forces by metallic wedges (not shown) which bear against machined dovetail surfaces (not shown) in each rotor coil slot. The endwinding is supported against centrifugal forces by a high strength, annular steel retaining ring 26. The inboard end of each retaining ring is shrunk onto a machined surface 28 of the rotor body, while the outboard end of the retaining ring 26 is shrunk onto a circular shaped steel member or centering ring 30. The rotor winding is electrically insulated from the rotor body and retaining ring via appropriate ground insulation. In addition, the turns which make up the coils of the rotor winding are electrically insulated against each other via appropriate turn-to-turn insulation. For the sake of simplicity, the insulation is not shown in the drawings. Note also that in FIG. 2, one half of the endwinding 12 is shown in simplified form. Spacer blocks that are normally present in the endwinding to separate the coils 14, 16, 18 and 20 have been eliminated for clarity.

A cylindrical sleeve-like baffle ring 32 is installed underneath the concentric rotor endwinding 12 to separate the endwinding ventilation section from the rotor body ventilation section of the rotor. The rotor endwinding is thus completely enclosed by the rotor body 10, the retaining ring 26, the centering ring 30, and the baffle ring 32. The baffle ring 32 is preferably constructed of non-metallic material and may be a full 360° ring, or may be formed as several arcuate segments with overlapping joints.

The baffle ring 32 may be captured in grooves 34 and 36 machined in the end of the rotor body 10 and the centering ring 30, but other assembly and mounting techniques may be employed. For example, the baffle ring 32 could be supported by a plurality of spokes (four preferred) radially extending between the spindle 24 and the baffle ring 32 at 90° intervals, or by any other suitable means as would be appreciated by one of ordinary skill in the art.

Figure 3:
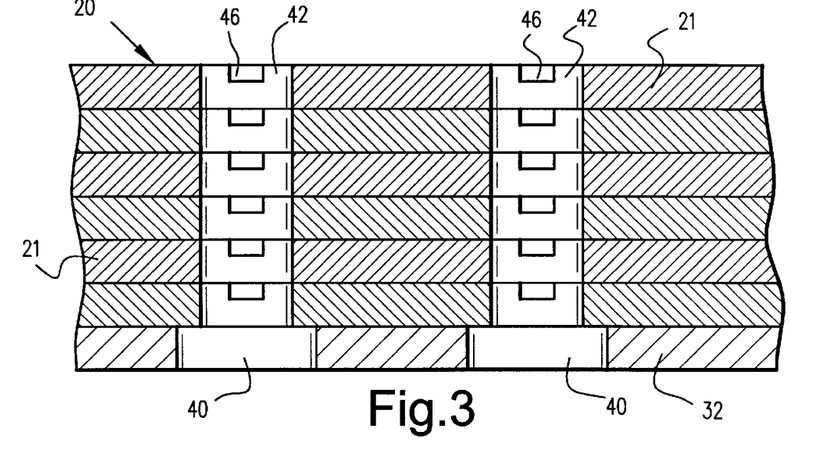
FIG. 3 is a partial side section taken along the line 3—3 of FIG. 2.

The baffle ring 32 has oblong holes 40 (FIG. 1) machined or molded therein at specific locations. The purpose of these holes is to feed cooling gas which flows axially between the inside diameter of the baffle ring 32 and the rotor spindle 24 into specifically positioned radial passages 42 in the field turns of the rotor endwinding coils, best seen in FIGS. 2 and 3. Passages 42 are formed by punching or machining vertically aligned holes or ducts into the copper turns 21. In this first exemplary embodiment of the invention, gas exit ports or grooves 44, 46 are machined on each lateral side of the radial passages 42 in some or all of the turns to allow cooling gas to exit from the radial passages 42 into longitudinal cavities or grooves 48, 49 and 50 between the coils 14 and 16, 16 and 18, and 18 and 20, respectively.

Curved vent slots 52 (FIGS. 1 and 2) are machined in the rotor body "teeth" (the solid portions between the radial slots 22 at the radial edge of the rotor body, also referred to herein as the pole face 23). This allows the cooling gas to flow from the longitudinal cavities 48, 49 and 50 between the coils into the slots 52 in the rotor body and then into the annular air gap between the machine's stator (not shown) and the rotor body 10. It will be appreciated that the curved vent slots 52 may be replaced by combinations of axially and radially extending holes. Some or all of the turns in coils 14, 16, 18 and 20 may also have longitudinal grooves 53 extending from the radial holes 42 closest to the pole face to radial chimneys 55 formed in the turns within the rotor body 10.

Returning to FIG. 1, in one possible cooling scheme, some of the cooling gas flows axially within a sub-slot 57 in the rotor body that, in turn, communicates with additional radial chimneys (not shown) formed in the coils at axially spaced locations along the rotor body. Note that chimney 55 does not connect with the sub-slot 57, but the chimneys axially inboard of chimney 55 do connect to the sub-slot 57. Chimney 55 communicates only with the grooves 53 in the field turns of the coils, i.e., with the endwinding ventilation scheme.

The flow of cooling gas into the vent slots or holes 52, grooves 53 and chimneys 55 results in the cooling of the transition section between the endwinding 12 and the rotor body 10. It should be appreciated that the cooling of the rotor body itself can be achieved by any compatible method such as radial cooling (or axial/radial cooling) via cooling gas fed from sub-slots (such as sub-slot 57) machined under the main coil slots in the rotor body, or any gap pickup body cooling scheme where cooling gas enters and discharges from the machine's air gap.

An additional benefit of the above described ventilation scheme is that cooling gas which flows in the longitudinal passages or cavities 48, 49 and 50 between the coils 14, 16, 18 and 20 will also help cool by convection the outer exposed surfaces of the turns 21 which make up the coils.

Figure 4:
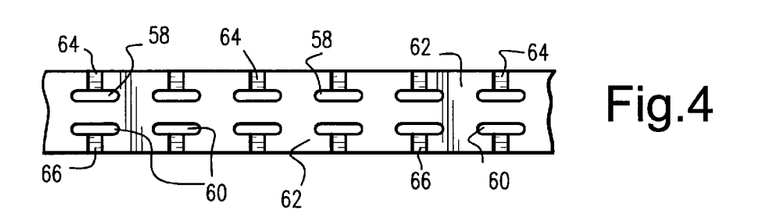
FIG. 4 is a partial plan view of an endwinding turn in accordance with an alternative embodiment of the invention, showing multiple rows of radial ducts in line.
Figure 5:
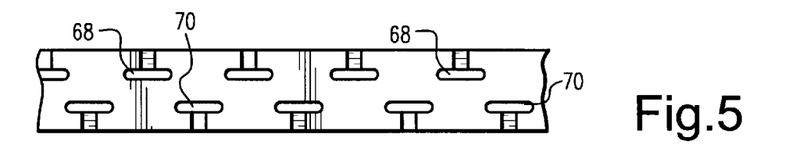
FIG. 5 is a partial plan view of an endwinding turn in accordance with still another alternative embodiment of the invention, showing multiple rows of radial ducts in line.

When the machine is running at rated speed, the pumping head of the machine's rotor drives the cooling gas flow through the passages. The cooling gas flow distribution within the radial passages 42 can be controlled via sizing of the holes 40, sizing of the punched holes in the turns which form the radial passages 42, sizing of the lateral exit ports 44 and 46, and the radial/axial alignment of the turns to insure that each turn in the section of the rotor endwinding of interest is ventilated properly. Multiple radial passage configurations are also possible. For example, two or more side-by-side radial passages can be employed in one or more of the coils, with appropriate modification to the baffle ring 32. In FIG. 4, side-by-side radial passages 58, 60 are located at axially spaced locations along the length of the coil turns (one indicated at 62). Lateral ducts or grooves 64 extend from passages 58 to one side of the turns, while lateral ducts or grooves 66 extend from passages 60 on the other side of the turns. FIG. 5 illustrates a similar arrangement but where the radial passages 68, 70 are staggered or offset in the axial direction.

Figure 9:
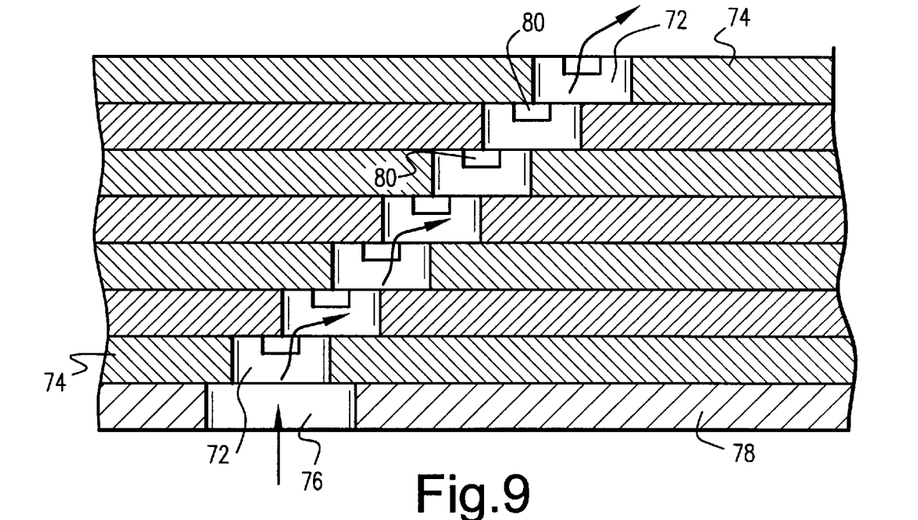
FIG. 9 is a partial side section through a stack of turns in the endwinding portion of a coil illustrating a diagonal ventilation pattern achieved by offsetting radial ducts in the turns.

With reference to FIG. 9, a diagonal flow passage is formed by offsetting the holes 72 in each successive radial turn 74, the lowermost (or radially innermost) hole 72 communicating with the oblong hole 76 in the baffle ring 78. Lateral ducts or grooves 80 extend to the edges of the turns as in FIG. 2.

Figure 10:
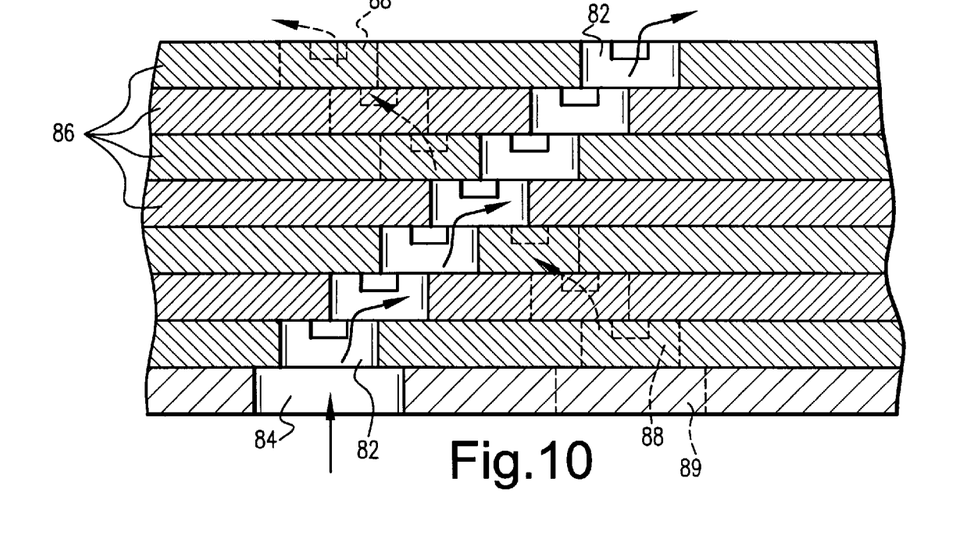
FIG. 10 is a partial side section through a stack of turns in the endwinding portion of a coil illustrating a diagonal/counterflow scheme.
Figure 11:
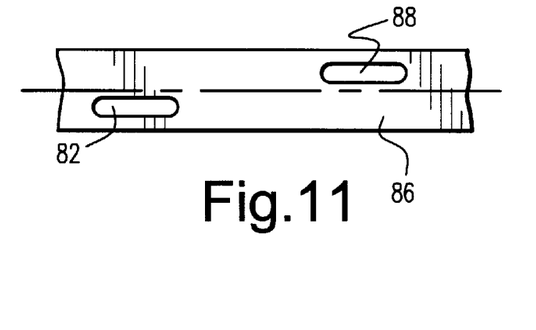
FIG. 11 is a partial plan view of a turn in the stack shown in FIG. 10.

Counterflow ventilation schemes are also contemplated. For example, in a given region of the coil, cooling gas can flow in separate passages in opposite directions with opposite inlet and exit locations. A side-by-side staggered radial duct arrangement as illustrated in FIG. 5 may be used to establish such a counterflow scheme. Thus, with reference to FIGS. 10 and 11, axially offset holes 82 in the stacked turns communicating with baffle ring hole 84 on the near side of turns 86 will establish a left-to-right diagonal flow pattern as viewed in FIG. 10. An oppositely staggered array of holes 88 on the opposite or far side of the turns 86 (see FIG. 11) communicating with baffle ring hole 89 will establish a second diagonal passage to thereby provide a counterflow path from right-to-left as also viewed in FIG. 10. This configuration provides lower and more uniform temperatures in the rotor endwinding as compared to non-counterflow schemes.

Figure 6:
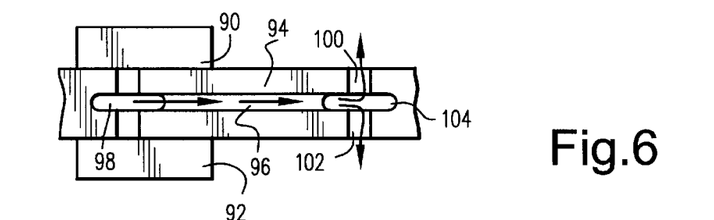
FIGS. 6 and 7 are partial plan views, partially sectioned, of rotor endwinding turns illustrating alternative arrangements for bypassing flow around spacer blocks.
Figure 7:
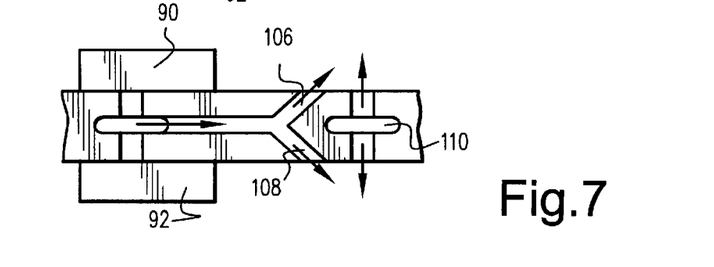
Figure 8:
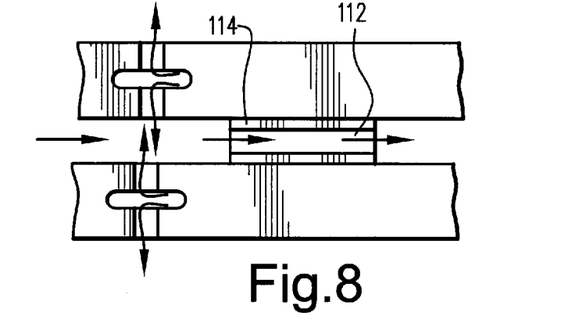
FIG. 8 shows still another alternative similar to FIGS. 6 and 7 but wherein coolant flow passes through the spacer block.

With reference now to FIG. 6, any obstacle in the cooling gas flow path, such as a rotor endwinding spacer blocks 90, 92 between adjacent endwinding coils (one shown at 94) can be bypassed via one or more grooves 96 machined along one or more adjacent field turns from the radial passage 98 to suitable exit ports 100, 102 on the far side of the spacer block, either at the next radial duct 104 (FIG. 6) or via separate exit ports 106, 108 adjacent the next radial duct 110 (FIG. 7). Alternatively, a hole 112 can be formed in the spacer block 114 to allow the gas to flow through it, as shown in FIG. 8. Another possibility is to utilize spacer block bypass schemes via bypass pockets in the baffle ring design.

Figure 12:
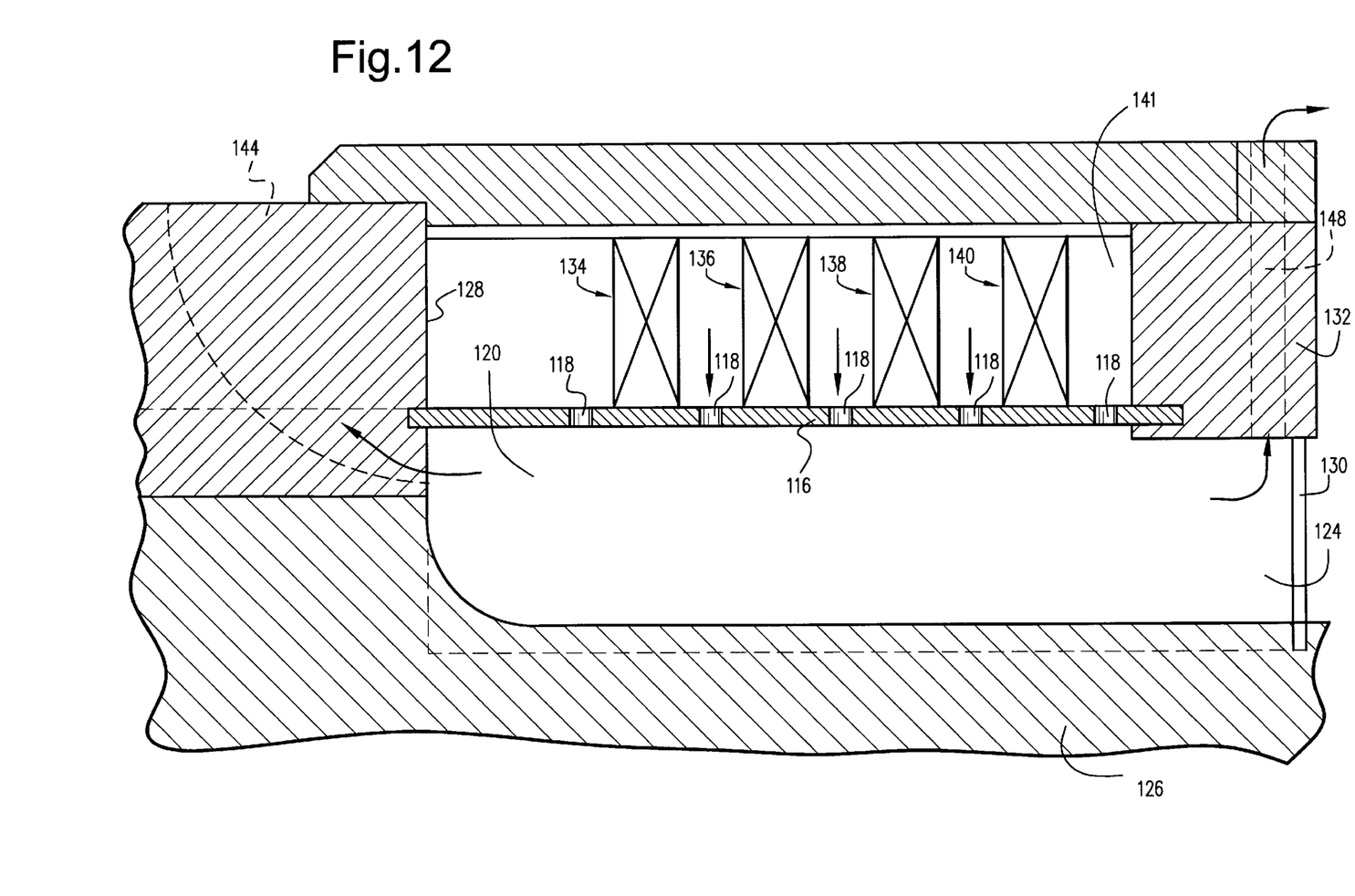
FIG. 12 is a partial radial section through a modified end of a machine rotor.
Figure 13:
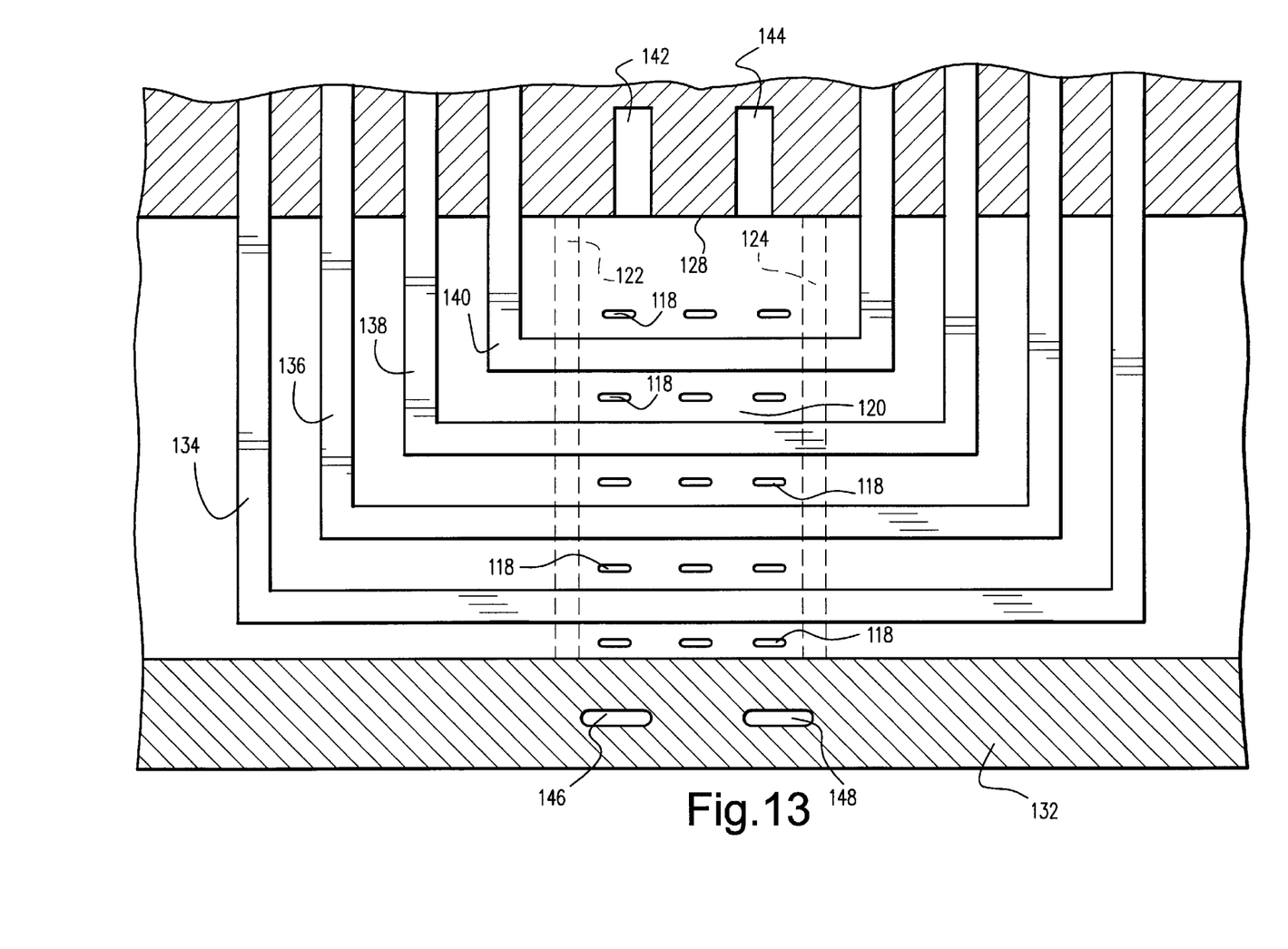
FIG. 13 is a top plan view, partially sectioned, of a two-pole rotor incorporating the endwinding ventilation scheme of FIG. 12.
Figure 14:
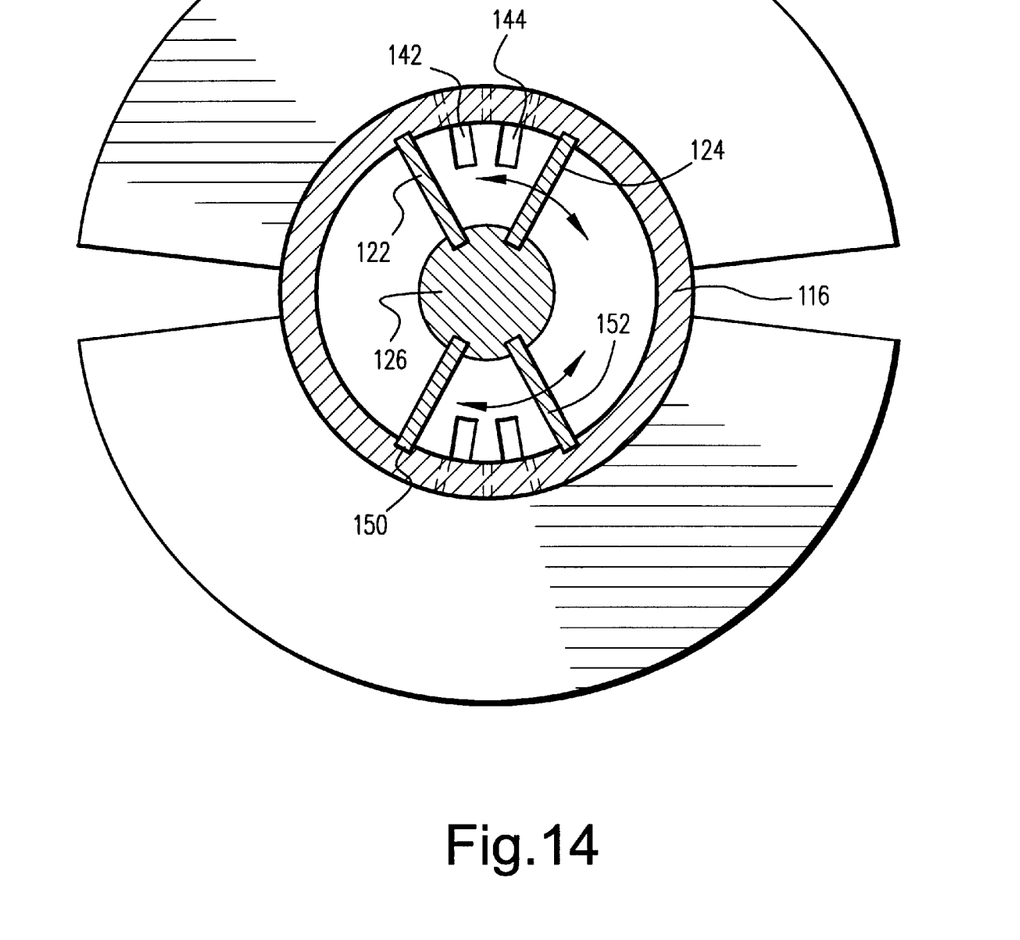
FIG. 14 is a simplified end view of the rotor endwinding shown in FIGS. 12 and 13, but also illustrating the lower half of the rotor.
Figure 15:
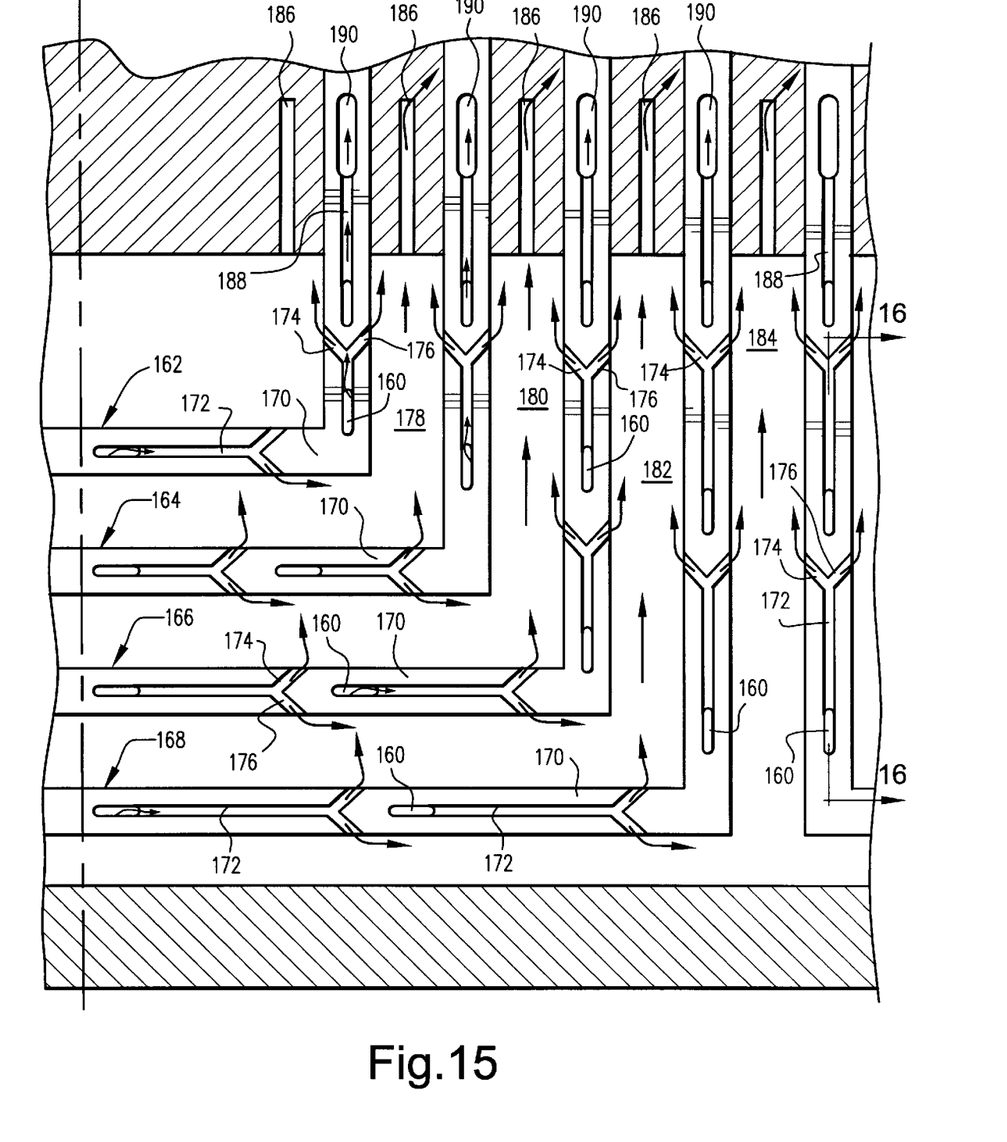
FIG. 15 is a partial top plan view, partially sectioned, of the coils of a rotor endwinding at one end of a rotor in accordance with a second exemplary embodiment of the invention.
Figure 16:
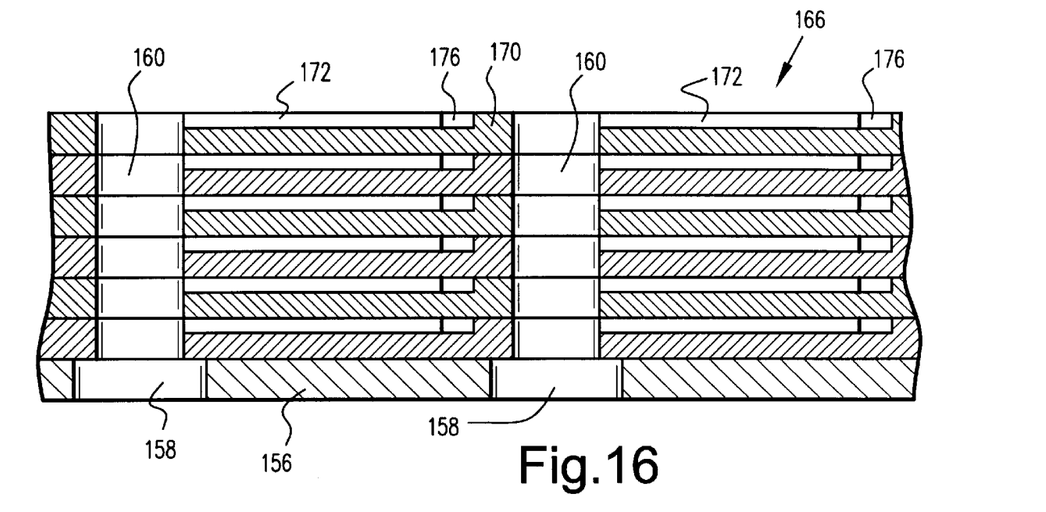
FIG. 16 is a partial side section taken along the line 16—16 of FIG. 15.

With reference now to FIGS. 12–14, a ventilation scheme is illustrated for applications where additional cooling gas discharge area may be required in the rotor endwinding region. An arrangement for two-pole machines is shown, but the concept can be extended to machines with more than two poles. Here, the baffle ring 116 is modified to include additional holes 118 opening into a longitudinal cavity 120 or passage in the center of the concentric coil arrangement. The center cavity is further defined by radial plates 122, 124 between the baffle ring 116 and the spindle 126 and extending axially between the rotor body or pole face 128 and a semi-annular end cover 130 (FIG. 12) located radially between the spindle 126 and the centering ring 132. As will be appreciated from FIGS. 12 and 13, the holes 118 in the baffle ring 116 are located to open into the spaces between the coils 134, 136, 138, 140 and 141, and between the plates 122, 124.

In this arrangement, cooling gas exiting the ports in the turns of the coils passes through the radial holes 118 in a radially inward direction from the spaces or cavities between the coils into the axial passage defined by plates 122, 124 below the baffle ring 116. The cooling gas can then flow axially in either direction, and can be discharged either into the air gap via vent slots 142, 144 machined into the pole face 128, or into the outside diameter of the centering ring 132 via discharge holes 146, 148 forming radial chimneys in the centering ring. Note that FIG. 14 illustrates the position of additional baffle plates 150, 152 for the opposite endwinding in a two pole rotor.

The centering ring discharge and pole face slot discharge scheme can be used independently or together, and can be combined with the ventilation schemes previously described to create as much discharge area as practical. The pole face discharge should work well for forward-flow and reverseflow ventilated machines, while the centering ring discharge works best with forward-flow ventilated machines. The schemes can be used for machines with more than two poles by adding additional radial plates for each pole.

Turning now to FIGS. 15–24, a second embodiment of the invention is illustrated where a certain number of turns in each of the coils have longitudinal grooves of any desired lengths that originate at the radial passages in the field turns. Specifically, and with reference to FIGS. 15 and 16, a baffle ring 156 is again formed with oblong holes 158 which are radially aligned with radial passages 160 that are established by holes formed in the various turns of one or more of the coils 162, 164, 166 and 168. In the figure, the uppermost surface of selected (or all) turns 170 is formed with a longitudinal groove 172 which communicates at one end with each radial passage 160. The longitudinal grooves 172 can be machined in either side of the turn and, for multiple conductor-per-turn windings, the grooves can be machined on the overlapping surfaces of mating conductors. The opposite end of the groove 172 communicates with lateral exit ports 174, 176 machined in the turn and extending from the longitudinal groove 172 to the outer edges of the turn, on both sides of the turn. Cooling gas can now flow through the grooves 172 and discharge through the lateral exit ports 174, 176 into the longitudinal cavities or spaces 178, 180, 182 and 184 formed between the coils on both sides of the coil of interest. It will be appreciated, however, that exit ports on only one side of the turn is also within the scope of the invention. As in the previously described embodiment, vent slots 186 (or holes) are machined in the rotor body to allow the cooling gas to flow from the longitudinal cavities 178, 180, 182 and 184 between the coils into the slots 186 and then into the air gap of the machine. As also apparent from FIG. 15, longitudinal grooves 188 can also be formed in the turns at locations close to the pole face of the rotor, with the grooves extending axially to radial discharge holes or chimneys 190 formed within the turns seated within the rotor slots.

Figure 17:
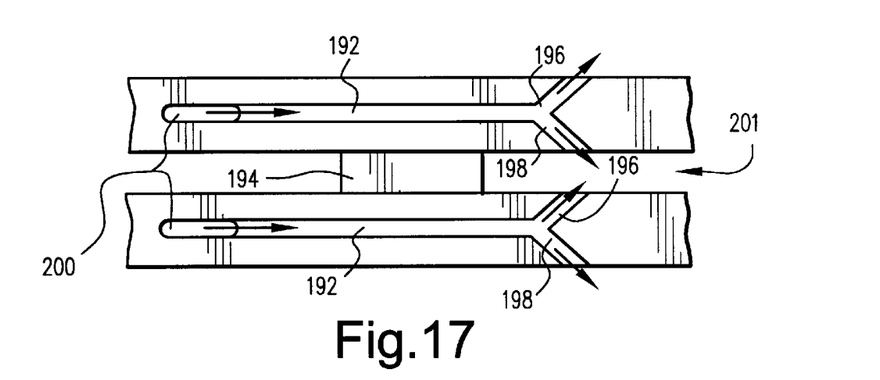
FIG. 17 is a partial plan view, partially sectioned, of rotor endwinding turns illustrating a bypass flow arrangement around a spacer block consistent with the second embodiment of the invention.
Figure 18:
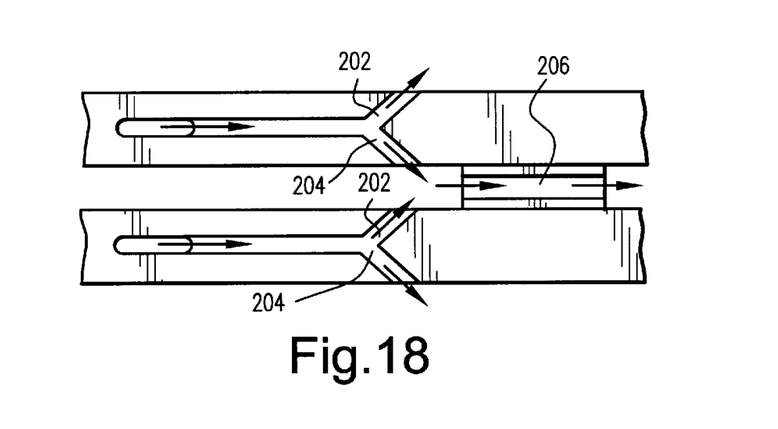
FIG. 18 is a partial plan view, partially sectioned, of rotor endwinding turns illustrating an alternative bypass flow arrangement consistent with the second exemplary embodiment of the invention.

FIGS. 17 and 18 illustrate additional bypass arrangements for spacer blocks. In FIG. 17, a longitudinal groove 192 is formed in the turns on either side of a spacer block 194 with lateral exit ports 196, 198 located on the far side of the spacer block. This allows cooling gas from radial passages 200 to bypass block 194 before entering the space 201 between the coils, downstream of the block. FIG. 18 illustrates an alternative arrangement where the lateral exit ports 202, 204 are located upstream of the spacer block, but the spacer block itself is formed with a through passage 206 to allow free flow of the cooling gas. Another possibility is to utilize spacer block bypass schemes via bypass pockets in the baffle ring design.

Figure 19:
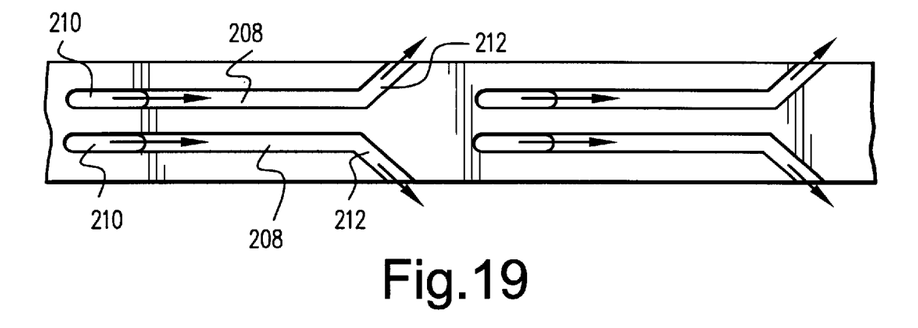
FIG. 19 is a partial plan view illustrating multiple rows of radial passages in an endwinding turn consistent with the second embodiment of the invention.
Figure 20:
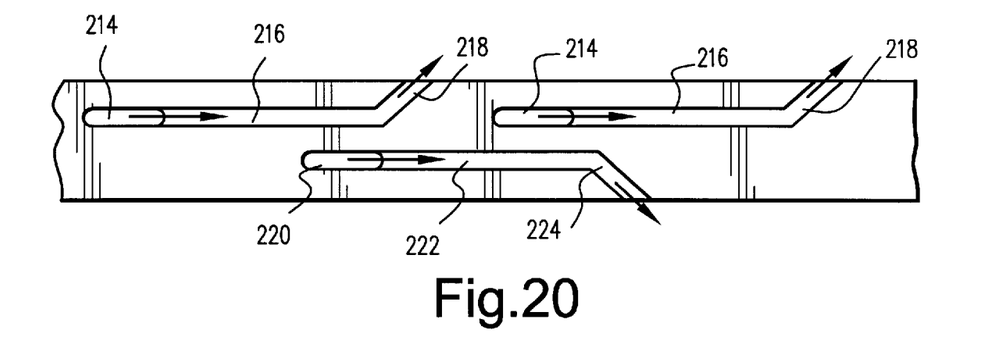
FIG. 20 is a partial plan view of a turn illustrating staggered rows of radial passages consistent with the second exemplary embodiment of the invention.

Multiple radial duct/groove configurations are also possible with this second embodiment of the invention, as illustrated in FIGS. 19 and 20. In the former, side-by-side longitudinally extending grooves 208 are paired with radial passages 210, with lateral exit ports 212 at opposite ends of the longitudinal grooves. This pattern can be repeated along the length of the turns as necessary to provide the desired cooling. FIG. 20 illustrates a staggered arrangement where radial passages 214 and longitudinal grooves 216 have single outlet exit ports 218 on one side of the turn, while a staggered array of radial passages 220, longitudinal grooves 222 and exit ports 224 extend along the opposite side of the turn.

Figure 21:
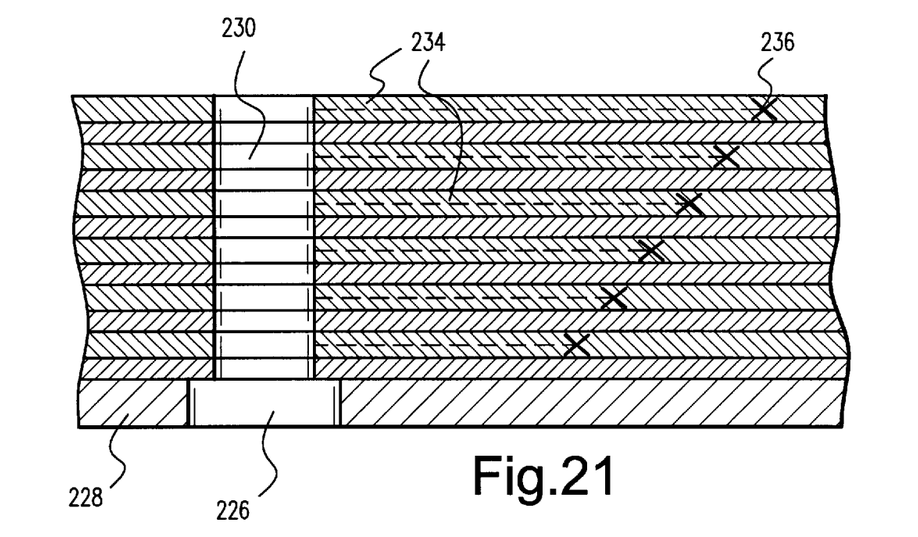
FIG. 21 is a partial side section through a stack of turns in an endwinding in accordance with the second embodiment of the invention, but with the length of the grooves formed within the individual turns having varying lengths.

It is also possible to provide a diagonal exit port array as illustrated in FIG. 21. In this figure, the oblong hole 226 in baffle plate 228 communicates with a radial passage 230 formed by holes in the stacked turns 232. Longitudinal grooves 234 extend from the radial passage 230 to exit ports (indicated schematically at 236). Note that the axial extent of the longitudinal grooves in successive turns increases to create a staggered discharge configuration through the stack of turns. It should be appreciated that other than diagonal exit port arrays are possible by simply varying the groove lengths within the conductors. In this way, all the turns can be effectively ventilated.

Figure 22:
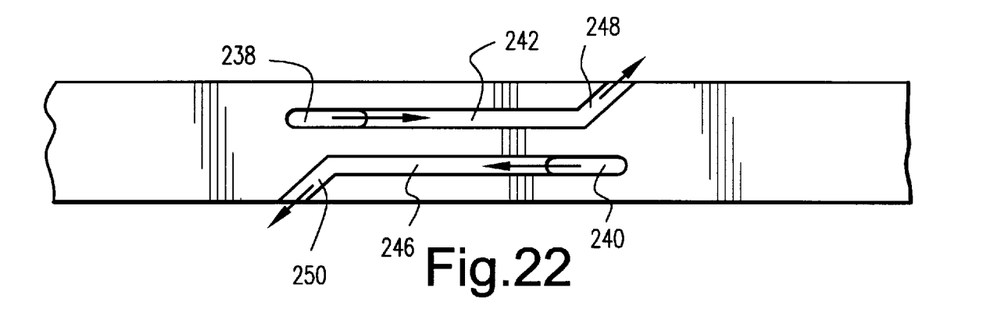
FIG. 22 is a partial plan view of a turn illustrating a counterflow scheme consistent with the second exemplary embodiment of the invention.
Figure 23:
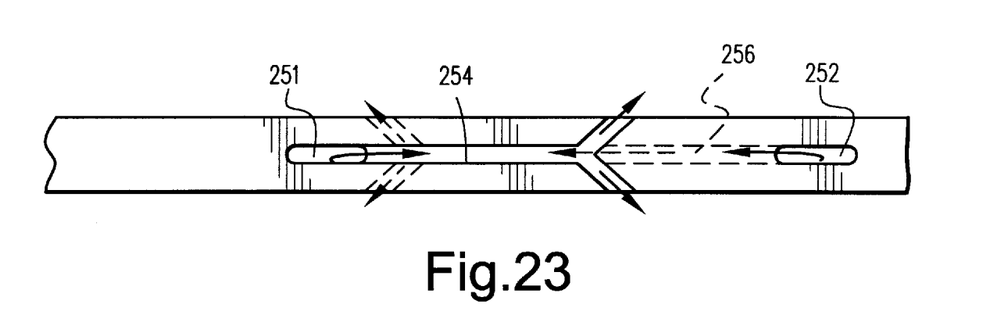
FIG. 23 is a partial plan view of a stack of turns illustrating counterflow paths in opposite directions on alternate turns.
Figure 24:
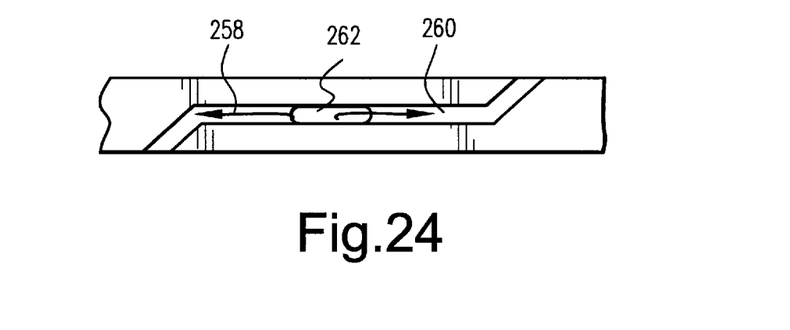
FIG. 24 is a partial plan view of a turn consistent with a second exemplary embodiment of the invention, but wherein a pair of longitudinal grooves extend from a single radial passage.

Counterflow schemes may be employed with this embodiment as well, and examples are illustrated in FIGS. 22 and 23. In FIG. 22, staggered radial passages feed longitudinal grooves 242, 246 and exit ports 248, 250 in which the cooling gas flow is in opposite directions. A similar arrangement may be implemented with side-by-side radial passages. Another example is shown in FIG. 23 in which axially spaced radial passages 251, 252 supply cooling gas to longitudinal grooves in alternate turns. Thus, the longitudinal groove 254 in the top turn is fed with cooling gas from the first radial passage 251, and the cooling gas flows from left to right. The longitudinal groove in the lower or bottom turn is fed with cooling gas from the second radial duct 252, and the cooling gas flows from right to left. Another possibility is to feed a pair of grooves 258, 260 from a single radial passage 262 as shown in FIG. 24.

It should also be pointed out that the mechanism by which cooling gas discharge areas can be increased as described in connection with FIGS. 12–14 may also be combined with the ventilation schemes described above in connection with FIGS. 15–24.

The above described ventilation schemes can be employed on any machine with a concentric wound field winding of suitable turn dimensions with square corner and/or C-shaped corner construction, and can most readily be applied to two pole and four pole round rotor turbine driven generators. The cooling gas can be any suitable gas but is most typically air or hydrogen.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cooling gas ventilation circuit for an endwinding of a rotary machine having a rotor and a plurality of coils seated in radial slots provided in said rotor, said coils each comprising a plurality of radially stacked turns, said turns having radial passages therein, said coils extending beyond a pole face of the rotor to form said endwinding; a substantially cylindrical baffle ring covering radially innermost turns of said plurality of coils in said endwinding, said baffle ring having a plurality of holes therein aligned with said radial passages; and wherein said radial passages communicate with cavities between said coils in said endwinding.

2. The cooling gas ventilation circuit of claim 1 wherein said coils in said endwinding are supported on radially outermost surfaces by a retaining ring, and wherein said coils are enclosed by said baffle ring, said retaining ring and a centering ring extending radially between said baffle ring and said retaining ring.

3. The cooling gas ventilation circuit of claim 2 wherein said rotor is formed with vent slots extending from said pole face in areas of said rotor between said radial slots in which said coils are seated.

4. The cooling gas ventilation circuit of claim 3 wherein certain of said radial passages communicate with radial discharge chimneys formed in said turns within said rotor.

5. The cooling gas ventilation circuit of claim 1 wherein said radial passages communicate with said cavities by lateral exit ports extending from said radial passages on one or both sides of said turns.

6. The cooling gas ventilation circuit of claim 1 wherein said exit ports are arranged substantially perpendicularly to side edges of said turns.

7. The cooling gas ventilation circuit of claim 1 wherein said exit ports are arranged at an acute angle to said side edges.

8. The cooling gas ventilation circuit of claim 7 wherein said radial passages and said exit ports are connected by longitudinal grooves in said turns.

9. The cooling gas ventilation circuit of claim 1 wherein two or more rows of radial passages are established in said turns of one or more of said coils, with exit ports from some of the rows opening to one side of said turns, and exit ports of the remaining rows opening to the other side of said turns.

10. The cooling gas ventilation circuit of claim 9 wherein radial passages are staggered along a length dimension of said turns.

11. The cooling gas ventilation circuit of claim 1 wherein said radial passages are staggered in a longitudinal direction.

12. The cooling gas ventilation circuit of claim 1 wherein one or more spacer blocks are inserted between said plurality of coils, and wherein means are provided for bypassing cooling gas around said spacer blocks.

13. The cooling gas ventilation circuit of claim 1 wherein said holes in said turns are arranged to create flow of cooling gas in said turns in opposite directions.

14. The cooling gas ventilation circuit of claim 1 and including axially extending plates radially between said baffle ring and a spindle portion of said rotor; said axially extending plates providing a cooling gas discharge channel communicating at one end thereof with a gas discharge slot in said rotor.

15. The cooling gas ventilation circuit of claim 1 and including axially extending plates radially between said baffle ring and a spindle portion of said rotor; said axially extending plates providing a cooling gas discharge channel communicating at an opposite end with a generally radial chimney extending through said centering ring.

16. The cooling gas ventilation circuit of claim 15 wherein additional holes in said baffle plate communicate directly with spaces between the coils.

17. A cooling gas ventilation circuit for an endwinding of a rotary machine having a rotor and a plurality of coils seated in radial slots provided in said rotor, said coils each comprising a plurality of radially stacked turns, said turns having radial passages therein, said coils extending beyond a pole face of the rotor to form said endwinding; a substantially cylindrical baffle ring covering radially innermost turns of said plurality of coils in said endwinding, said baffle ring having a plurality of holes therein aligned with said radial passages; said radial passages communicating with cavities between said coils in said endwinding by lateral exit ports extending from said radial passages on one or both sides of said turns; said coils in said endwinding being supported on radially outermost surfaces by a retaining ring such that said coils are enclosed by said baffle ring, said retaining ring and a centering ring extending radially between said baffle ring and said retaining ring; and wherein said rotor is formed with vent slots extending from said pole face in areas of said rotor between said radial slots in which said coils are seated.

18. The cooling gas ventilation circuit of claim 17 wherein said exit ports are arranged substantially perpendicularly to side edges of said turns.

19. The cooling gas ventilation circuit of claim 17 wherein said exit ports are arranged at an acute angle to said side edges.

20. The cooling gas ventilation circuit of claim 19 wherein said radial passages and said exit ports are connected by longitudinal grooves in said turns.

21. The cooling gas ventilation circuit of claim 17 wherein said radial passages are staggered in an axial direction.

22. The cooling gas ventilation circuit of claim 21 wherein said holes in said turns are arranged to create flow of cooling gas in said turns in opposite directions.

23. The cooling gas ventilation circuit of claim 17 and including axially extending plates radially between said baffle ring and a spindle portion of said rotor and wherein additional holes in said baffle ring communicate directly with spaces between the coils; said axially extending plates providing a cooling gas discharge channel communicating at one end thereof with a gas discharge slot in said rotor.

24. The cooling gas ventilation circuit of claim 17 and including axially extending plates radially between said baffle ring and a spindle portion of said rotor; said axially extending plates providing a cooling gas discharge channel communicating at an opposite end with a generally radial chimney extending through said centering ring.

25. The cooling gas ventilation circuit of claim 1 wherein each turn is comprised of one or more layers of conductors.

* * * * *